United States Patent [19]

Hong

[11] Patent Number: 5,063,440
[45] Date of Patent: Nov. 5, 1991

[54] STILL/MOVING PICTURE SELECTION CONTROL CIRCUIT FOR VIDEO PHONE SYSTEM

[75] Inventor: Sam P. Hong, Kyungsangbook, Rep. of Korea

[73] Assignee: Goldstar Co., Ltd., Seoul, Rep. of Korea

[21] Appl. No.: 559,165

[22] Filed: Jul. 30, 1990

[30] Foreign Application Priority Data

Jul. 31, 1989 [KR] Rep. of Korea ............... 11264/1989

[51] Int. Cl.[5] ............................................. H04N 7/14
[52] U.S. Cl. ............................................ 358/85; 379/53
[58] Field of Search ................... 358/85, 83, 105, 133, 358/134; 379/53, 54

[56] References Cited

U.S. PATENT DOCUMENTS 4,009,330  2/1977  Cutler et al. ............................ 358/83
4,888,795  12/1989  Ando et al. ............................ 358/85
4,924,311  5/1990  Ohki et al. ............................. 358/85

Primary Examiner—Victor R. Kostak
Attorney, Agent, or Firm—Rosen, Dainow & Jacobs

[57] ABSTRACT

A still/moving picture selection control circuit for selecting a still picture or a moving picture in a video phone system by the operation of a switch. The circuit including a still selection unit for outputting pulse signals, a single-frame signal generating unit for generating single-frame signal, a movie signal generating unit for generating or stopping movie control signals, a still-/movie control unit for applying a subcarrier frequency signal to an A/D converter when single-frame signal is output from the single-frame signal generating unit or when movie control signal is output from the movie signal generating unit, a memory section for storing the output signals of the A/D converter to a RAM when the single-frame signal is output and for applying the signals stored in the RAM to a D/A converter when the single-frame signal is not output.

6 Claims, 2 Drawing Sheets

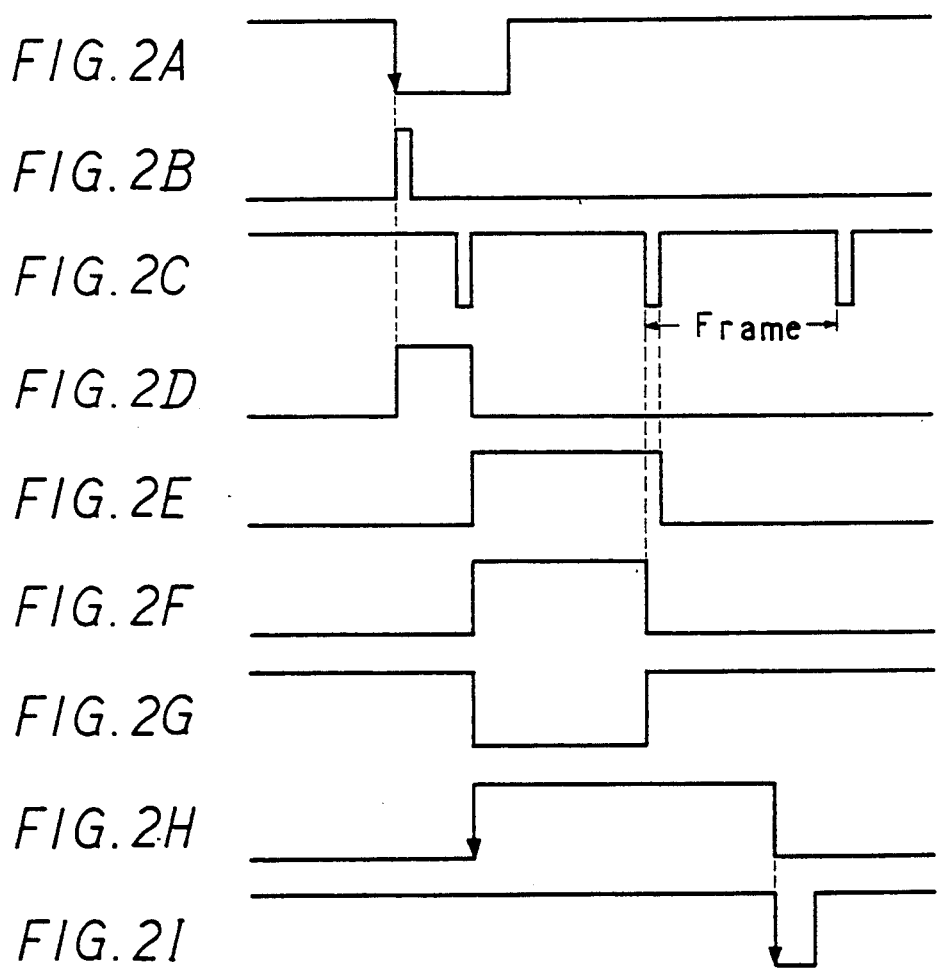

STILL/MOVING PICTURE SELECTION CONTROL CIRCUIT FOR VIDEO PHONE SYSTEM

BACKGROUND OF THE INVENTION

The present invention relates to a picture selection control circuit of a video phone system which can select the picture of video phone system with a still picture or a moving picture upon the operation of a switch.

In a generally used video phone system, video signals being input are displayed on a screen as they are, on an apparatus not provided for selecting and displaying the video signals as a still picture or a moving picture. Accordingly, it is inconvenient for users who wish to see the screen in a still picture.

SUMMARY OF THE INVENTION

Therefore, it is an object of the present invention to provide a still/moving picture selection control circuit of a video phone system which can display video signals being input as a still picture or a moving picture.

Another object of the present invention is to provide a still/moving picture selection control circuit of a video phone system with a simple structure which can select video signals being input as a still picture or a moving picture upon the operation of a switch.

The objects of the present invention are accomplished by providing a circuit comprising an analog/digital converter for converting input video signals into digital signals synchronized with a subcarrier frequency signal, a digital/analog converter for converting the output signals of the analog/digital converter into analog signals by being synchronized with the subcarrier frequency signal, a still selection unit for outputting pulse signals by the short-circuit of a still switch, a single-frame signal generating unit for generating one-frame signals by being synchronized with a vertical synchronizing signal after the pulse signals are output from the still selection unit, a movie signal generating unit for continuously outputting movie control signal in response to the short-circuit of a movie switch and for stopping the output of movie control signals by the single-frame signal of the single-frame signal generating unit, a still/movie control unit for applying the subcarrier frequency signal to the analog/digital converter only when single-frame signal is outputted from the single-frame signal generating unit or the movie control signal is outputted from the movie signal generating unit, and a memory section for storing the output signals of the analog/digital converter in a RAM when the single-frame signal is output from the single-frame signal generating unit and for applying the signals stored in the RAM to the digital/analog converter when a single-frame signal is not output from the single-frame signal generating unit and a movie control signal is not output from the movie signal generating unit.

BRIEF DESCRIPTION OF THE DRAWINGS

The present invention will become more fully understood from the detailed description given hereinbelow and the accompanying drawings which are given by way of illustration only, but thus are not limitative of the present invention, and wherein:

FIGS. 2A to 2I are waveform views of each part of FIG. 1.

DETAILED DESCRIPTION OF THE INVENTION

Figure 1:
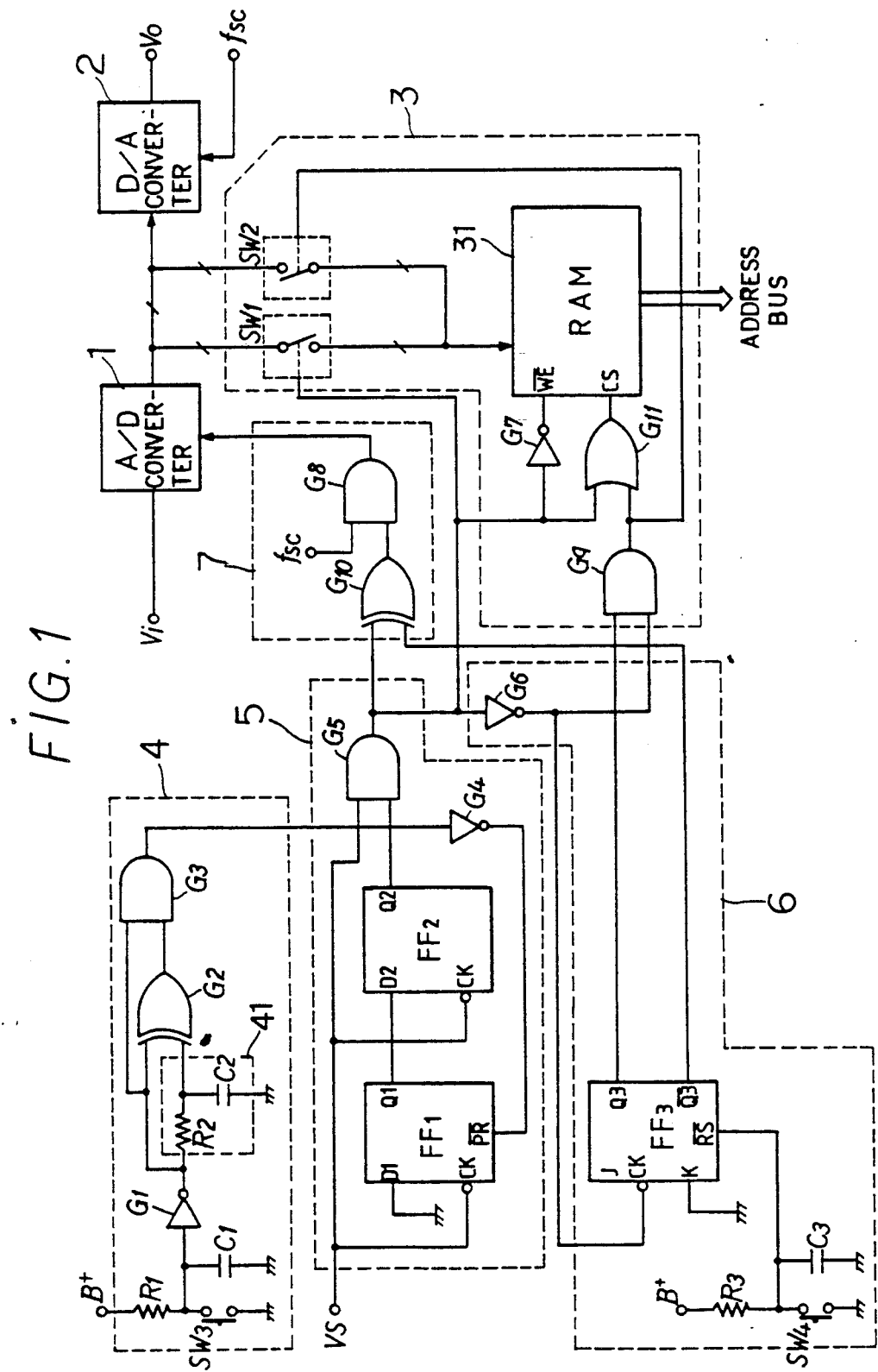
FIG. 1 is a circuit diagram of a still/moving picture selection control circuit of a video phone system according to the present invention.

Hereinafter, a preferred embodiment of the present invention will be described in detail with reference to FIGS. 1 and 2 as follows:

Referring to FIG. 1, the still/moving picture selection control circuit for a video phone system according to the present invention comprises a still selection unit 4 for outputting pulse signals by the short-circuit of a still switch SW3, a single-frame signal generating unit 5 for generating single-frame signals synchronized with a vertical synchronizing signal when pulse signals are outputted from the still selection unit 4, a movie signal generating unit 6 for continuously outputting movie control signals by the short-circuit of a movie switch SW4 and for stopping the output of movie control signals by the single-frame signals of the single-frame signal generating unit 5; a still/movie control unit 7 for applying the subcarrier frequency signal to an analog/digital converter 1 only when the single-frame signals are output from the single-frame signal generating unit 5 or the movie control signals are outputted from the movie signal generating unit 6; and a memory section 3 for storing the output signals of the analog/digital converter 1 to a RAM 31 when the single-frame signals are outputted from the single-frame signal generating unit 5 and for applying the signals stored in the RAM 31 to a digital/analog converter 2 when the single-frame signals are not output from the single-frame signal generating unit 5 and the movie control signals are not outputted from the movie signal generating unit 6.

In the still selection unit 4 is constituted in a manner that a connection node of a resister R1, a still switch SW3 and a capacitor C1 is connected to one input terminal of an exclusive OR gate G2 and one input terminal of an AND gate G3 via an inverter G1. The output of converter G1 is connected to the other input terminal of the exclusive OR gate G2 via an integrator 41 consisting of a resistor R2 and a capacitor C2, and the output terminal of the exclusive OR gate G2 is connected to the other input terminal of the AND gate G3, whereby a high potential pulse signal is outputted from the AND gate G3 when the input of the unit 4 is short-circuited by the still switch SW3.

In the single-frame signal generating unit 5, the output terminal of the AND gate G3, which is an output terminal of the still selection unit 4, is connected to a preset terminal ($\overline{PR}$) of a flip-flop FF1 via an inverter G4, a vertical synchronizing signal input terminal (VS) is connected to clock terminals of flip-flops FF1 and FF2 and one input terminal of an AND gate G5, an output terminal Q1 of the flip-flop FF1 is connected to an input terminal D2 of the flip-flop FF2, and an output terminal Q2 of the flip flop FF2 is connected to the other input terminal of the AND gate G5, thereby outputting a high potential signal of one frame synchronized with a vertical synchronizing signal after a high potential pulse signal is output from the still selection unit 4.

In the movie signal generating unit 6, an output terminal of the AND gate G5, which is an output terminal of the single-frame signal generating unit 5, is connected to a clock terminal (CK) of a flip-flop FF3 via an inverter G6, and a connection node of a resistor R3, a movie switch SW4 and a capacitor C3 is connected to a reset terminal ($\overline{RS}$) of the flip-flop FF3, thereby outputting a movie control signal when the movie switch SW4 is short-circuited and prohibiting the movie control signal from being output when a high potential signal of one frame is output from the single-frame signal generating unit 5.

In the still/movie control unit 7 an output terminal of the AND gate G5, which is an output terminal of the one frame signal generating unit 5, and an output terminal $\overline{Q3}$ of the flip-flop FF3 are connected to one input terminal of an AND gate G8 via an OR gate G10, the other input terminal of the AND gate G8 being supplied with a subcarrier frequency signal (fsc), and the output terminal of the AND gate G8 is connected to the analog/digital converter 1 to which video signals are applied, whereby the subcarrier frequency signal (fsc) is applied to the analog/digital converter 1 only when a high potential signal of single-frame is output from the single-frame signal generating unit 6 or when a movie control signal is output from the movie signal generating unit 6.

In memory section 3, the output terminal of the single-frame signal generating unit is connected to a control terminal of the switch SW1 and one input terminal of an OR gate G11 and is connected to a write enable terminal ($\overline{WE}$) of a RAM31 via an inverter G7. An output terminal of an inverter G6 which is connected to the output terminal of the single-frame signal generating unit 5 and the output terminal Q3 of the flip-flop FF3 of the movie signal generating unit 6 are connected to the other input terminal of the OR gate G11 and a control terminal of a switch SW2 via an AND gate G9. An output terminal of the OR gate G11 is connected to a chip selecting terminal (CS) of the RAM31 and the switches SW1 and SW2 are connected in parallel between the connection node of the analog/digital converter 1 and the digital/analog converter 2 and the RAM31, whereby the RAM31 assumes to a writing-state and records the signals which are output from the analog/digital converter 1 when a high potential signal of one frame is output from the single-frame signal generating unit 5, and the RAM3 assumes to a reading-state and reads the signals recorded therein to output to the digital/analog converter 2 when a high potential signal of single-frame is not outputted from the one-frame signal generating unit 5 and a movie control signal is not output from the movie signal generating unit 6.

The operation and effect of the present invention will be described hereinafter.

When a power is applied to a power terminal B+ and the still switch SW3 is pressed down, a low potential signal, as shown in FIG. 2A, is applied to an input terminal of the inverter G1 and a high potential signal is output from the output terminal of the inverter G1, and the high potential signal is applied to one input terminal of each of the exclusive OR gate G2 and AND gate G3 and then to the other input terminal of the exclusive OR gate G2 after being delayed a predetermined time in the integrator 41 as determined by the resistor R2 and capacitor C2. Thus, a high potential signal is output from the exclusive OR gate G2 for the delay time and applied to the other side input terminal of the AND gate G3 so that the AND gate G3 outputs high potential pulse signals as shown in FIG. 2B. The high potential pulse signals are inverted to low potential pulse signals by the inverter G4 and applied to a preset terminal ($\overline{PR}$) of the flip-flop FF1 so that the flip-flop FF1 is preset and a high potential signal, as shown in FIG. 2D, is output from the output terminal Q1 and applied to an input terminal D2 of the flip-flop FF2. At this time, vertical synchronizing signals as shown in FIG. 2C are applied to the vertical synchronizing signal input terminal (VS), a low potential signal as shown in FIG. 2D is output from the output terminal Q1 of the flip-flop FF1 at the time that the vertical synchronizing signal is input the first time, and at the same time a high potential signal as shown in FIG. 2E is output from the output terminal Q2 of the flip-flop FF2 and applied to the other input terminal of the AND gate G5. Thereafter a low potential signal is output from the output terminal Q2 of the flip-flop FF2 when the vertical synchronizing signal is input again.

As a result, the AND gate G5 accomplishes the AND operation of the signals as shown in FIGS. 2C and 2E and outputs high potential signals for one frame period. The high potential signal output from the AND gate G5 is applied to one input terminal of the AND gate G8 through the OR gate G10, and the subcarrier frequency signal (fsc) is applied to the analog/digital converter 1 through the AND gate G8. Accordingly, video signals which are input to the video signal input terminal (Vi) are synchronized with the subcarrier frequency signal (fsc) at the analog/digital converter 1 and converted to digital signals, and then synchronized again with the subcarrier frequency signal (fsc) at the digital/analog converter 2 and converted to analog signals and output to a video signal output terminal (Vo). At this time, the high potential signal which is output from the AND gate G5 of the single-frame signal generating unit 5 is applied to a control terminal of the switch SW1 to short-circuit and is applied to the chip selecting terminal (cs) of the RAM31 to select this RAM via the OR gate G11. The high potential signal is inverted into a low potential signal at the inverter G7 and applied to the write enable terminal ($\overline{WE}$) of the RAM31 so that the RAM31 assumes to a writing-state. Accordingly, the signals which are output from the analog/digital converter 1 are stored in the RAM31 through the switch SW1.

Furthermore, the high potential signal which is output from the AND gate G5 is inverted to a low potential signal, as shown in FIG. 2G, by the inverter G6 and applied to the clock terminal (CK) of the flip-flop FF3 so that a high potential signal, as shown in FIG. 2H, is output from the output terminal Q3 of the flip-flop FF3 and a low potential signal is output from the output terminal $\overline{Q3}$ thereof. Thereafter, when a low potential signal, as shown in FIG. 2F, is output from the AND gate G5 of the single-frame signal generating unit 5, a low potential signal is output from the OR gate G10 so that the subcarrier frequency signal (fsc) does not pass through the AND gate G8, and the analog/digital converter 1 does not carry out the analog/digital converting operation.

At this time, since the low potential signal output from the AND gate G5 is applied to the control terminal of the switch SW1, the switch SW1 assumes to an open-state, and the low potential signal is inverted into a high potential signal by the inverter G7 and applied to a write enable terminal ($\overline{WE}$) of the RAM31. The low potential signal output from the AND gate G5 is inverted into a high potential signal, as shown in FIG. 2G, by the inverter G6 and applied to one input terminal of the AND gate G9, and since a high potential signal being output from the output terminal Q3 of the flip-flop FF3 is applied to the other input terminal of the AND gate G9, a high potential signal is output from the AND gate G9 and the high potential signal is applied to the control terminal of the switch SW2 to close this switch. The high potential signal output from the AND gate G9 is applied to a chip selecting terminal (cs) of the RAM31 through the OR gate G11, whereby the RAM31 assumes to a reading-state.

Accordingly, digital signals stored in the RAM31 are read and pass through the switch SW2 and are converted into analog signals at the digital/analog converter 2 and synchronized with the subcarrier frequency signal (fsc) and then output to the video signal output terminal (Vo).

As a result, at this time the signals stored in the RAM31 are continuously output for one frame period so that still pictures can be displayed.

Meanwhile, if the movie switch SW4 is short-circuited, a low potential signal, as shown in FIG. 2I, is applied to the reset terminal ($\overline{RS}$) of the flip-flop FF3, so that the flip-flop FF3 is reset and movie control signals are output therefrom. That is, since a low potential signal, as shown in FIG. 2H, is output from the output terminal Q3 of the flip-flop FF3, a low potential signal is output from the AND gate G9, so that the RAM31 is not selected and the switch SW2 is opened.

Furthermore, at this time a high potential signal which is a movie control signal is output from the output terminal $\overline{Q3}$ of the flip-flop FF3, and since the high potential signal is applied to the AND gate G8 through the OR gate G10, the subcarrier frequency signal (fsc) is applied continuously to the analog/digital converter 1 through the AND gate G8. Accordingly, video signals being input to the video signal input terminal (Vi) are converted into digital signals at the analog/digital converter 1 and synchronized with the subcarrier frequency signal (fsc) and then converted into analog signals at the digital/analog converter 2 and synchronized with the subcarrier frequency signal (fsc) and output continuously to the video signal output terminal (Vo), whereby moving pictures are displayed.

What is claimed is:

1. A still/moving picture selection control circuit for a video phone system comprising:
   an analog/digital converter for converting input video signals to digital signals synchronized with a subcarrier frequency signal;
   a digital/analog converter for converting and outputting the output signals of the analog/digital converter to analog signals synchronized with the subcarrier frequency signal;
   a still selection unit for outputting pulse signals in response to the closing of a still switch;
   a single-frame signal generating unit for generating single-frame signals synchronized with a vertical synchronizing signal when pulse signals are output from the still selection unit;
   a moving picture signal generating unit for continuously outputting moving picture control signals in response to the closing of a moving picture switch and for stopping the output of moving picture control signals by the single-frame signals of the single-frame signal generating unit;
   a still/moving picture control unit for applying the subcarrier frequency signal to the analog/digital converter only when the single-frame signals are output from the single-frame signal generating unit or the moving picture control signals are output from the moving picture signal generating unit; and
   a memory section for storing the output signals of the analog/digital converter in a RAM when the single-frame signals are output from the single-frame signal generating unit and for applying the signals stored in the RAM to the digital/analog converter when the single-frame signals are not output from the single-frame signal generating unit and the moving picture control signals are not output from the moving picture signal generating unit.

2. A system for enabling the selective display of a single frame or a moving picture, comprising
   a source of video signals;
   single frame selecting means comprising means for producing an enabling signal that is of a single frame duration of said video signals,
   a random access memory;
   a source of a subcarrier;
   first means responsive to said enabling signal for converting said video signals to first digital signals in synchronism with the frequency of the subcarrier, for a first single frame duration, and storing them in said random access memory;
   second means responsive to said enabling signal for reading said random access memory during a second single frame duration following said first single frame duration;
   means for converting said converted digital signal in synchronism with the subcarrier frequency during said first frame duration and for converting the output of said random access memory during said second single frame duration, to product output analog signals; and
   a moving picture selecting means for controlling said first means responsive to said enabling signal to continuously convert said video signals to first digital signals and for controlling said second means responsive to said enabling signal to continuously selectively convert only the output of said first means to output analog signals.

3. The system of claim 2 wherein said first means comprises an analog to digital converter for converting said video signals at said subcarrier frequency, means responsive to said enable signal for gating said subcarrier to said analog to digital converter, and switch means for applying the output of said analog to digital converter to said random access memory.

4. The system of claim 2 wherein said second means comprises switch means responsive to said enable signal for reading out said random access memory to said digital to analog converter.

5. The system of claim 2 wherein said means for producing said enable signal comprises a switch, and means responsive to operation of said switch for generating said enable signal 6. The system of claim 2 wherein said moving picture selecting means comprises a switch, and means responsive to the operation of said switch for inhibiting reading data from and writing data to said random access memory.

* * * * *